(12) United States Patent
Nakashima et al.

(10) Patent No.: US 9,977,171 B2
(45) Date of Patent: *May 22, 2018

(54) OPTICAL WAVEGUIDE SHEET, BACKLIGHT UNIT, AND PORTABLE TERMINAL

(71) Applicant: KEIWA INC., Osaka (JP)

(72) Inventors: Hironori Nakashima, Osaka (JP); Kenichi Harada, Osaka (JP)

(73) Assignee: Keiwa Inc., Osaka (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/626,239

(22) Filed: Feb. 19, 2015

(65) Prior Publication Data

US 2015/0234114 A1    Aug. 20, 2015

(30) Foreign Application Priority Data

Feb. 19, 2014 (JP) .................. 2014-030081
Feb. 12, 2015 (JP) .................. 2015-025799

(51) Int. Cl.
*F21V 7/04* (2006.01)
*F21V 8/00* (2006.01)

(52) U.S. Cl.
CPC ......... *G02B 6/0036* (2013.01); *G02B 6/0043* (2013.01); *G02B 6/0055* (2013.01); *G02B 6/0058* (2013.01); *G02B 6/0088* (2013.01)

(58) Field of Classification Search
CPC .. G02B 6/0036; G02B 6/0043; G02B 6/0055; G02B 6/0058; B29D 11/00663
USPC .................................. 362/623–626
See application file for complete search history.

(56) References Cited

U.S. PATENT DOCUMENTS

| | | | | |
|---|---|---|---|---|
| 2004/0145915 A1* | 7/2004 | Kim | ..................... | G02B 6/0036 362/559 |
| 2005/0270802 A1* | 12/2005 | Hsu | ..................... | G02F 1/133615 362/626 |
| 2009/0147353 A1* | 6/2009 | Yang | ..................... | G02B 6/0036 359/350 |
| 2009/0279324 A1* | 11/2009 | Chen | ..................... | G02B 6/0036 362/616 |

(Continued)

FOREIGN PATENT DOCUMENTS

| | | |
|---|---|---|
| CN | 101451684 A | 6/2009 |
| JP | 2005-268201 | 9/2005 |

(Continued)

*Primary Examiner* — Alexander Garlen
(74) *Attorney, Agent, or Firm* — Norris McLaughlin & Marcus, P.A.

(57) ABSTRACT

An optical waveguide sheet for use in an edge-lit backlight unit is provided, that allows rays of light to enter the end face and emits the rays of light from the front face substantially uniformly. The optical waveguide sheet includes, on the back side thereof: a plurality of recessed portions falling toward the front face side; and a plurality of raised portions each provided around each of the plurality of recessed portions and projecting toward the back face side. The optical waveguide sheet preferably has an average thickness of no less than 100 μm and no greater than 600 μm, and is preferably used as a light guide film. The optical waveguide sheet preferably has an average thickness of no less than 100 μm and no greater than 600 μm, and is preferably used as a light guide film.

7 Claims, 6 Drawing Sheets

(56) References Cited

U.S. PATENT DOCUMENTS

| | | | |
|---|---|---|---|
| 2010/0014316 A1* | 1/2010 | Yue | G02B 6/0036 |
| | | | 362/619 |
| 2010/0208496 A1* | 8/2010 | Kim | B29D 11/00663 |
| | | | 362/613 |
| 2011/0228556 A1* | 9/2011 | Wang | G02B 6/0036 |
| | | | 362/606 |
| 2011/0272834 A1* | 11/2011 | Yue | G02B 6/0036 |
| | | | 264/1.24 |
| 2015/0092440 A1* | 4/2015 | Kim | G02B 6/0036 |
| | | | 362/608 |

FOREIGN PATENT DOCUMENTS

| | | |
|---|---|---|
| JP | 2006-278348 | 10/2006 |
| JP | 2010-164914 | 7/2010 |
| JP | 2010-177130 | 8/2010 |
| JP | 2012-138209 | 7/2012 |
| KR | 20070045350 | 5/2007 |
| KR | 10-2010-0092757 A | 8/2010 |
| TW | 480352 B | 3/2002 |
| WO | WO-2006/046638 | 5/2006 |

\* cited by examiner (a)

OPTICAL WAVEGUIDE SHEET, BACKLIGHT UNIT, AND PORTABLE TERMINAL

FIELD OF THE INVENTION

The present invention relates to an optical waveguide sheet, a backlight unit, and a portable terminal.

BACKGROUND OF THE INVENTION

Figure 6:
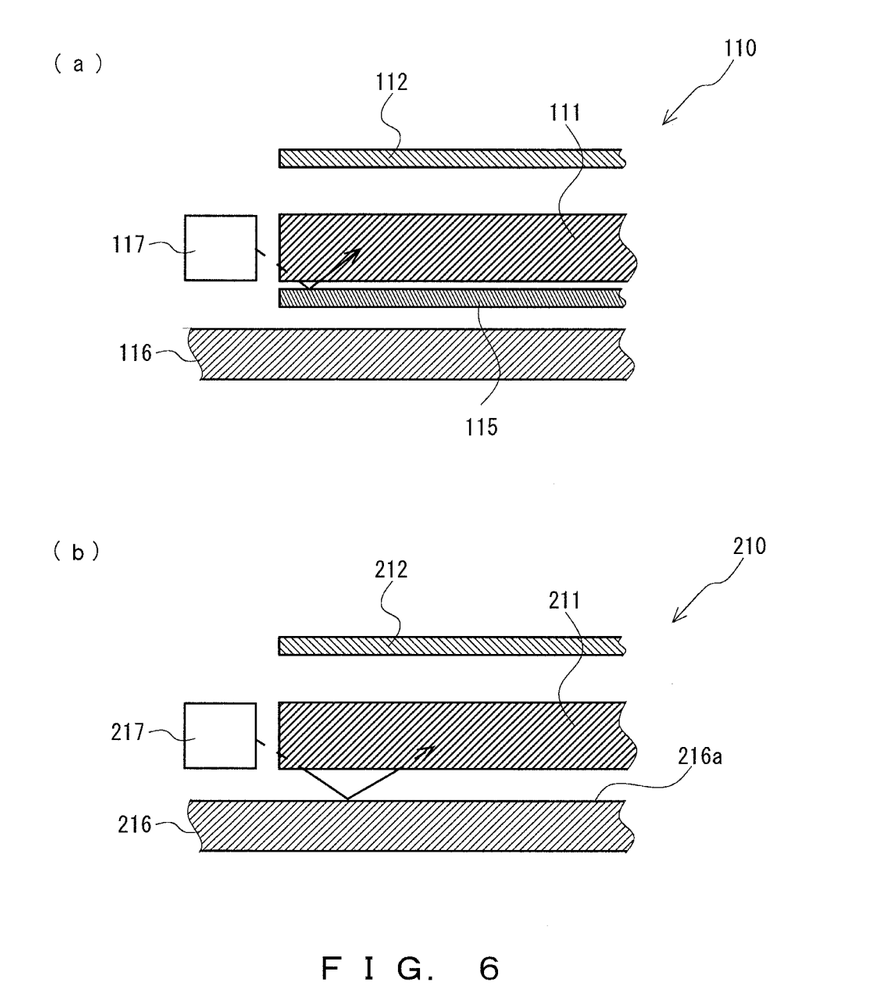
FIG. 6 shows a schematic cross sectional view illustrating a conventional edge-lit backlight unit.

Liquid crystal display devices in widespread use have been in a backlight system where light emission is executed by illuminating a liquid crystal layer from the rear face. In this system, a backlight unit such as edge-lit backlight unit or a direct-lit backlight unit is mounted on the underside of the liquid crystal layer. As shown in FIG. 6a, such an edge-lit backlight unit 100 generally includes a reflection sheet 115 disposed on the front face of a top plate 116, an optical waveguide sheet 111 disposed on the front face of the reflection sheet 115, an optical sheet 112 disposed on the front face of the optical waveguide sheet 111, and a light source 117 that emits rays of light toward the end face of the optical waveguide sheet 111 (see Japanese Unexamined Patent Application, Publication No. 2010-177130). In the edge-lit backlight unit 100 shown in FIG. 6a, rays of light that have been emitted from the light source 117 and have entered the optical waveguide sheet 111 propagate through the optical waveguide sheet 111. A part of the propagating rays of light exit from the back face of the optical waveguide sheet 111, are reflected on the reflection sheet 115, and enter again the optical waveguide sheet 111.

In liquid crystal display devices having such a liquid crystal display unit, in order to enhance its portability and user-friendliness, a reduction in thickness and weight is required, leading to a requirement also for a reduction in thickness of the liquid crystal display unit. In particular, in ultrathin portable terminals in which the thickness of the thickest part of its housing is no greater than 21 mm, it is desired that the thickness of the liquid crystal display unit is about 4 mm to 5 mm, and thus, even further a reduction in thickness of the edge-lit backlight unit incorporated into the liquid crystal display unit has been desired.

In regard to the edge-lit backlight unit of such an ultrathin portable terminal, in addition to the edge-lit backlight unit having the reflection sheet 115 disposed on the back face of the optical waveguide sheet 111 shown in FIG. 6a, an edge-lit backlight unit is also proposed in which a reduction in thickness is attempted, as shown in FIG. 6b, by omitting the reflection sheet 115 shown in FIG. 6a. The edge-lit backlight unit 210 shown in FIG. 6b includes a metal top plate 216, an optical waveguide sheet 211 overlaid on the front face of the top plate 216, an optical sheet 212 overlaid on the front face of the optical waveguide sheet 211, and a light source 217 that emits rays of light toward the end face of the optical waveguide sheet 211. The front face of the top plate 216 is finished by polishing and functions as a reflection surface 216a. In this example, the rays of light that have been emitted from the light source 217 and have entered the optical waveguide sheet 211 propagate through the optical waveguide sheet 211, and a part of the propagating rays of light exit from the back face of the optical waveguide sheet 211, are reflected on the reflection surface 216a as the front face of the top plate 216, and enter again the optical waveguide sheet 211. Thus, in the edge-lit backlight unit 210 shown in FIG. 6b, the front face of the top plate 216 corresponds to the reflection surface 216a, and therefore the reflection surface 216a can serve as a substitute for the reflection sheet 115 shown in FIG. 6a. Therefore, such an edge-lit backlight unit 210 omits the reflection sheet 115, leading to a facilitation of the reduction in thickness. In addition, some edge-lit backlight units for such ultrathin portable terminals include an optical waveguide sheet (light guide film) having an average thickness of no greater than 600 μm, whereby a further reduction in thickness is achieved.

PRIOR ART DOCUMENTS

Patent Document 1: Japanese Unexamined Patent Application, Publication No. 2010-177130

SUMMARY OF THE INVENTION

The present inventors found that when such a liquid crystal display device is used, a drawback arises that luminance of the liquid crystal display surface is uneven (lack in uniformity of luminance). The present inventors thoroughly investigated the cause of the drawback, and consequently found the back face of the optical waveguide sheet adheres (sticks) to the front face of the reflection sheet or the top plate disposed on the back face side of the optical waveguide sheet, and then rays of light enter the adhering portion, leading to the lack in uniformity of luminance.

The present invention was made in view of the foregoing circumstances, and an object of the present invention is to provide an optical waveguide sheet in which, when used in an edge-lit backlight unit, the reduction in thickness thereof is achieved while inhibiting the lack in uniformity of luminance of a liquid crystal display surface. Moreover, another object of the present invention is to provide an edge-lit backlight unit and a portable terminal that achieve a reduction in thickness thereof while inhibiting the lack in uniformity of luminance.

According to a first aspect of the present invention made for solving the aforementioned problems, an optical waveguide sheet for use in an edge-lit backlight unit, the optical waveguide sheet having a function of allowing rays of light to enter an end face of the optical waveguide sheet and emitting the rays of light from a front face substantially uniformly, includes on the back side thereof: a plurality of recessed portions falling toward the front face side; and a plurality of raised portions each provided around each of the plurality of recessed portions and projecting toward the back face side.

Since the optical waveguide sheet includes, on the back face thereof, the plurality of recessed portions falling toward the front face side, the optical waveguide sheet enables rays of light having entered the recessed portions to be scattered toward the front face side. Therefore, according to the optical waveguide sheet, providing the plurality of recessed portions in desired positions and scattering incident light by means of the recessed portions enables the rays of light to be emitted substantially uniformly from the front face side. Moreover, due to the optical waveguide sheet including the plurality of raised portions each provided around each of the plurality of recessed portions and projecting toward the back face side, the optical waveguide sheet abuts the reflection sheet, the top plate or the like disposed on the back face side of the optical waveguide sheet at dispersed points by way of the plurality of raised portions, whereby the adhesion of the back face of the optical waveguide sheet to the reflection sheet, the top plate or the like can be inhibited. Therefore, the optical waveguide sheet can inhibit rays of light from entering such an adhering portion to give rise to the lack in uniformity of luminance, and additionally it is not necessary to separately provide a sticking preventive layer on the back face of the optical waveguide sheet, whereby the reduction in thickness can be facilitated. Furthermore, due to the raised portions being provided around the recessed portions, the optical waveguide sheet can properly inhibit the adhesion at the recessed portions and in the vicinity of the recessed portions, and consequently the lack in uniformity of luminance due to the rays of light scattered by the recessed portions can be favorably inhibited.

The optical waveguide sheet preferably has an average thickness of no less than 100 μm and no greater than 600 μm, and is preferably used as a light guide film. Thus, the optical waveguide sheet can be suitably used in a backlight unit for ultrathin portable terminals.

The average depth (L) of the recessed portions from the back face on average level is preferably no less than 1 μm and no greater than 10 μm. Thus, the rays of light having entered the recessed portions may be scattered toward the front face of the optical waveguide sheet, and consequently emitted precisely from the front face of the optical waveguide sheet. In addition, since the depth of the recessed portions is as low as no greater than 10 μm, a reduction of the thickness of the optical waveguide sheet can be achieved, whereby the optical waveguide sheet can be used as a light guide film.

The average diameter (D) of the recessed portions on the back face on average level is preferably no less than 10 μm and no greater than 50 μm. Thus, the rays of light having entered the recessed portions may be scattered precisely, and then favorably emitted from the entire front face of the optical waveguide sheet.

The average height (H) of the raised portions from the back face on average level is preferably no less than 0.1 μm and no greater than 5 μm. Thus, the sticking-preventing ability of the recessed portions and the vicinity thereof can be improved, and additionally the lack in uniformity of luminance due to the rays of light scattered by the recessed portions can be properly inhibited. Moreover, according to such a configuration, the generation of scratches on the front face of the reflection sheet or the top plate due to the abutting thereof on the raised portions can be inhibited.

According to the optical waveguide sheet, each raised portion is preferably formed to be substantially annular in a planar view so as to surround each of the recessed portions. Moreover, the average width (W) of the raised portions on the back face on average level is preferably no less than 1 μm and no greater than 10 μm. When each raised portion is thus formed to be substantially annular in a planar view, each raised portion is present around each recessed portion in any direction on the back face on average level, leading to a favorable symmetry. Therefore, rays of light can be favorably scattered by the recessed portions irrespective of the incident direction thereof. In addition, when the average width (W) of the raised portions falls within the above range, the sticking can be favorably inhibited while minimizing an area on the raised portions in which the back face of the optical waveguide sheet is in contact with the surface of reflection plate, whereby the lack in uniformity of luminance is less likely to occur.

The height ratio (H/W) of the average height (H) to the average width (W) of the raised portions is preferably no less than 0.05 and no greater than 0.5. Thus, the scratch-inhibiting ability with respect to the front face of the reflection sheet or the top plate disposed on the back face side and the sticking-preventing ability can be improved.

The optical waveguide sheet preferably contains a polycarbonate resin as a principal component. Thus, total reflection is likely to occur on the front and back faces of the optical waveguide sheet and consequently the rays of light are enabled to efficiently propagate, since the polycarbonate resin has superior transparency and a high refractive index. In addition, since the polycarbonate resin has heat resistance, occurrence of deterioration due to heat generation from the light source, and the like may be minimized. Furthermore, the polycarbonate resin exhibits a more moderate water absorbing property as compared with acrylic resins and the like, leading to superior dimension accuracy. Therefore, due to containing the polycarbonate resin as a principal component, degradation of the optical waveguide sheet over time can be inhibited.

According to a second aspect of the present invention made for solving the aforementioned problems, an edge-lit backlight unit includes the optical waveguide sheet having the configuration described above, and a light source that emits rays of light toward the end face of the optical waveguide sheet.

Due to including the optical waveguide sheet according to the first aspect of the present invention, the backlight unit can scatter the rays of light having entered the plurality of recessed portions provided on the back face of the optical waveguide sheet toward the front face side. Therefore, providing the plurality of recessed portions at desired positions on the back face of the optical waveguide sheet, and scattering incident light by means of the recessed portions enables the backlight unit to emit rays of light substantially uniformly from the front face side. Moreover, according to the backlight unit, due to the optical waveguide sheet including the plurality of raised portions each provided around each of the plurality of recessed portions and projecting toward the back face side, the optical waveguide sheet abuts the reflection sheet, the top plate or the like disposed on the back face side of the optical waveguide sheet at dispersed points by way of the plurality of raised portions, whereby the adhesion of the back face of the optical waveguide sheet to the reflection sheet, the top plate or the like can be inhibited. Therefore, the backlight unit can inhibit rays of light from entering such an adhering portion to give rise to the lack in uniformity of luminance, and additionally it is not necessary to separately provide a sticking preventive layer on the back face of the optical waveguide sheet, whereby the reduction in thickness can be facilitated. Furthermore, due to the raised portions provided on the back face of the optical waveguide sheet being provided around the recessed portions, the backlight unit can properly inhibit the adhesion at the recessed portions and in the vicinity of the recessed portions, and consequently the lack in uniformity of luminance due to the rays of light scattered by the recessed portions can be favorably inhibited.

According to a third aspect of the present invention made for solving the aforementioned problems, a portable terminal includes the backlight unit having the configuration described above according to the second aspect of the present invention in a liquid crystal display unit.

Due to including the backlight unit including the optical waveguide sheet according to the first aspect of the present invention, the portable terminal can emit rays of light substantially uniformly from the front face of the optical waveguide sheet, and additionally the sticking of the optical waveguide sheet to the reflection sheet, the top plate or the like disposed on the back face side of the optical waveguide sheet can be inhibited. In addition, due to including the backlight unit including the optical waveguide sheet according to the first aspect of the present invention, the portable terminal can facilitate the reduction in thickness.

It is to be noted that the term "front face" of the optical waveguide sheet as referred to herein means a side toward which the optical waveguide sheet emits rays of light, and hence a display surface side of a liquid crystal display unit. Moreover, the term "back face" of the optical waveguide sheet as referred to means a face on the other side of the front face, and hence the other side of the display surface of the liquid crystal display unit. The term "average thickness" as referred to means an average of values determined in accordance with A-2 method prescribed in JIS-K-7130, section 5.1.2. The term "diameter" as referred to means an intermediate value between the maximum diameter and the maximum length of the secant along a direction perpendicular to the maximum diameter direction. The "width" of the raised portion as referred to means a difference between an outer radius and an inner radius.

As explained in the foregoing, when the optical waveguide sheet according to the first aspect of the present invention is used in an edge-lit backlight unit, the lack in uniformity of luminance of a liquid crystal display surface can be inhibited and a reduction in thickness can be achieved. Therefore, the edge-lit backlight unit according to the second aspect of the present invention including the optical waveguide sheet according to the first aspect of the present invention, and the portable terminal according to the third aspect of the present invention including the backlight unit enable inhibition of the lack in uniformity of luminance of a liquid crystal display unit, and a reduction in thickness to be achieved.

DESCRIPTION OF THE PREFERRED EMBODIMENTS

Hereinafter, preferred modes for carrying out the invention will be explained in more detail with references to the drawings, if necessary.

First Embodiment
Portable Terminal

Figure 1:
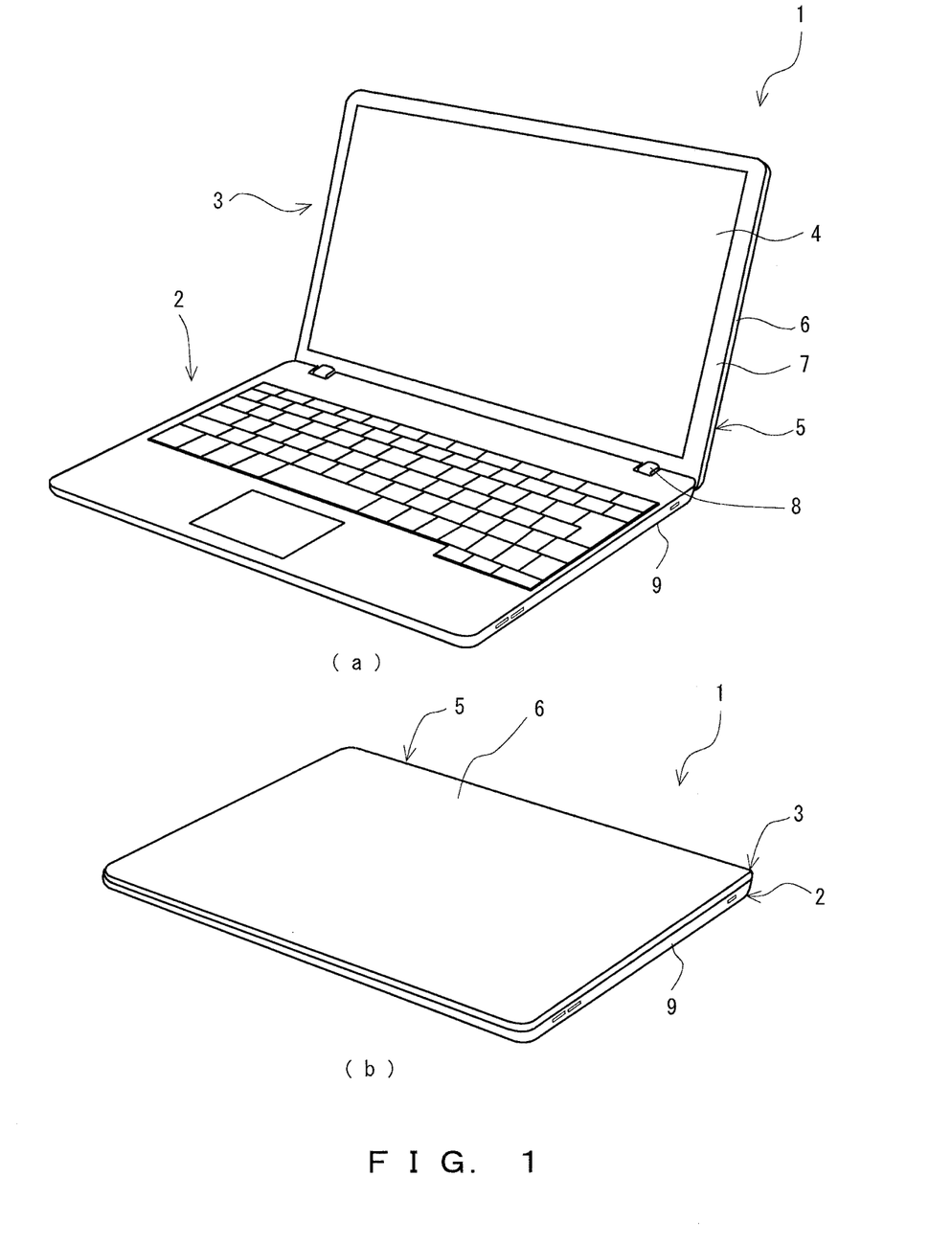
FIG. 1 shows a schematic perspective view of a portable terminal according to an embodiment of the present invention illustrating: (a) a state in which a liquid crystal display unit is lifted; and (b) a state in which the liquid crystal display unit is closed.

A portable terminal 1 shown in FIG. 1 includes an operation unit 2, and a liquid crystal display unit 3 rotatably (enabling to be opened/closed) attached to the operation unit 2. A housing of the portable terminal 1 (i.e., a casing that totally accommodates components of the portable terminal 1) has a thickness of no greater than 21 mm (at the thickest part (when the liquid crystal display unit 3 is closed)), and therefore the portable terminal 1 is an ultrathin laptop computer (hereinafter, may be also referred to as "ultrathin computer 1").

The liquid crystal display unit 3 of the ultrathin computer 1 includes a liquid crystal panel 4, and an edge-lit, ultrathin backlight unit that emits rays of light toward the liquid crystal panel 4 from the back face side. The liquid crystal panel 4 is held at the back face, the lateral face and a circumference of the front face by a casing for a liquid crystal display unit 5 of the housing. In this embodiment, the casing for a liquid crystal display unit 5 includes a top plate 6 disposed on the back face (and the rear face) of the liquid crystal panel 4, and a front face support member 7 disposed on the front face side of the circumference of the front face of the liquid crystal panel 4. The housing of the ultrathin computer 1 includes the casing for a liquid crystal display unit 5, and a casing for an operation unit 9 that is rotatably attached to the casing for a liquid crystal display unit 5 via a hinge part 8 and contains a central processing unit (ultra-low voltage CPU) and the like.

The average thickness of the liquid crystal display unit 3 is not particularly limited as long as the housing thickness falls within a desired range, but the upper limit of the average thickness of the liquid crystal display unit 3 is preferably 7 mm, more preferably 6 mm, and still more preferably 5 mm. On the other hand, the lower limit of the average thickness of the liquid crystal display unit 3 is preferably 2 mm, more preferably 3 mm, and still more preferably 4 mm. When the average thickness of the liquid crystal display unit 3 exceeds the upper limit, it may be difficult to satisfy a requirement of a reduction in thickness of the ultrathin computer 1. On the other hand, when the average thickness of the liquid crystal display unit 3 is less than the lower limit, a decrease in strength and/or in luminance and the like of the liquid crystal display unit 3 may be incurred.

Backlight Unit

Figure 2:
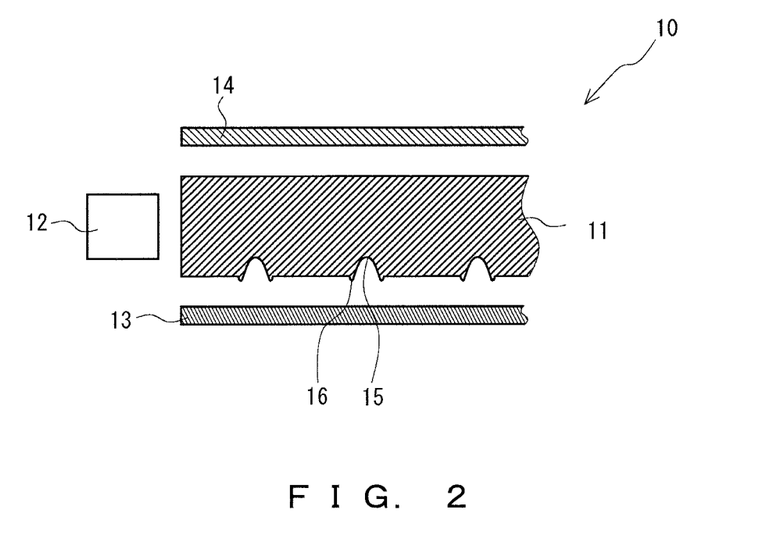
FIG. 2 shows a schematic cross sectional view illustrating an edge-lit backlight unit of the portable terminal shown in FIG. 1.

A backlight unit 10 shown in FIG. 2 is to be included in the liquid crystal display unit 3 of the ultrathin computer 1. The backlight unit 10 is configured as an edge-lit backlight unit that includes an optical waveguide sheet 11, a light source 12 that emits rays of light toward the end face of the optical waveguide sheet 11, a reflection sheet 13 disposed on the back face side of the optical waveguide sheet 11, and an optical sheet 14 disposed on the front face side of the optical waveguide sheet 11.

Optical Waveguide Sheet

Figure 3:
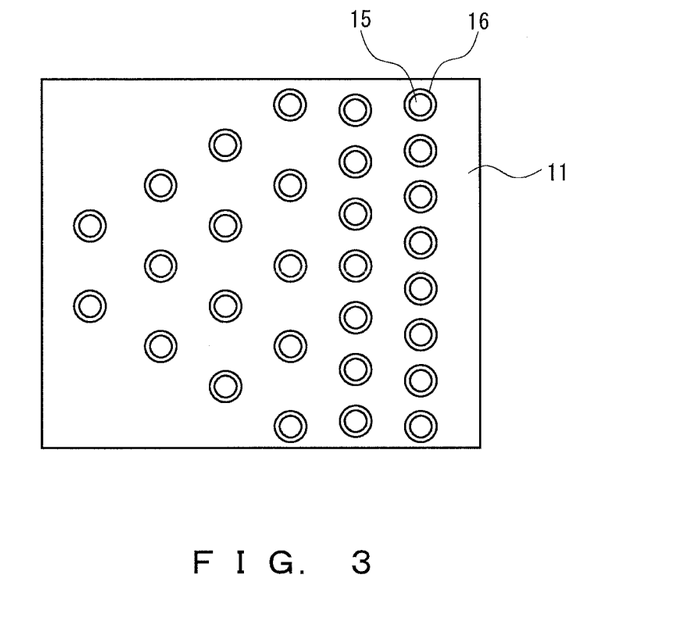
FIG. 3 shows a schematic rear view of an optical waveguide sheet of the backlight unit shown in FIG. 2.

The optical waveguide sheet 11 allows the rays of light having entered from the end face to exit from the front face substantially uniformly. In addition, the optical waveguide sheet 11 includes, on the back face thereof, a plurality of recessed portions 15 falling toward the front face side, and a plurality of raised portions 16 each provided around each of the plurality of recessed portions 15 and projecting toward the back face side, as shown in FIG. 3. The optical waveguide sheet 11 is formed into a plate (non-wedge shape) that is substantially rectangular-shaped in a planar view and has a substantially uniform thickness.

The upper limit of the average thickness of the optical waveguide sheet 11 is preferably 600 μm, more preferably 580 μm, and still more preferably 550 μm. On the other hand, the lower limit of the average thickness of optical waveguide sheet 11 is preferably 100 μm, more preferably 150 μm, and still more preferably 200 μm. When the average thickness of the optical waveguide sheet 11 exceeds the upper limit, it may be difficult to use the optical waveguide sheet 11 as a thin light guide film desired for the ultrathin portable terminals, and consequently it may be difficult to satisfy a requirement of a reduction in thickness of the backlight unit 10. To the contrary, when the average thickness of the optical waveguide sheet 11 is less than the lower limit, the strength of the optical waveguide sheet 11 may be insufficient, and a sufficient amount of rays of light from the light source 12 may not be introduced to the optical waveguide sheet 11.

The lower limit of the required light guide distance of the optical waveguide sheet 11 from the end face thereof on the light source 12 side is preferably 7 cm, more preferably 9 cm, and still more preferably 11 cm. On the other hand, the upper limit of the required light guide distance of the optical waveguide sheet 11 from the end face thereof on the light source 12 side is preferably 45 cm, more preferably 43 cm, and still more preferably 41 cm. When the required light guide distance is less than the lower limit, the optical waveguide sheet 11 may not be used in larger size terminals other than small-size portable terminals. To the contrary, when the required light guide distance exceeds the upper limit, bending is likely to occur in the use of the optical waveguide sheet 11 as a thin light guide film having an average thickness of no greater than 600 μm, and additionally sufficient light guiding properties may not be achieved. It is to be noted that the required light guide distance of the optical waveguide sheet 11 from the end face thereof on the light source 12 side as referred to means a distance which the rays of light emitted from the light source 12 and entering the end face of the optical waveguide sheet 11 need to travel from the end face toward the opposed end face. Specifically, for example, for unilateral edge-lit backlight units, the required light guide distance of the optical waveguide sheet 11 from the end face thereof on the light source 12 side means a distance from the end face of the optical waveguide sheet on the light source side to the opposed end face, and for bilateral edge-lit backlight units, the required light guide distance is a distance from the end face of the optical waveguide sheet on the light source side to the central portion.

The lower limit of the surface area of the optical waveguide sheet 11 is preferably 150 cm$^2$, more preferably 180 cm$^2$, and still more preferably 200 cm$^2$. On the other hand, the upper limit of the surface area of the optical waveguide sheet 11 is preferably 1,000 cm$^2$, more preferably 950 cm$^2$, and still more preferably 900 cm$^2$. When the surface area of the optical waveguide sheet 11 is less than the lower limit, the optical waveguide sheet 11 may not be used in larger size terminals other than small-size portable terminals. To the contrary, when the surface area of the optical waveguide sheet 11 exceeds the upper limit, bending is likely to occur in the use of the optical waveguide sheet 11 as a thin light guide film having an average thickness of no greater than 600 μm, and additionally sufficient light guiding properties may not be achieved.

Since the optical waveguide sheet 11 needs to transmit rays of light, the optical waveguide sheet 11 is formed from a transparent, in particular colorless and transparent synthetic resin as a principal component. The principal component of the optical waveguide sheet 11 is exemplified by a polycarbonate resin, an acrylic resin, polyethylene terephthalate, polyethylene naphthalate, polystyrene, a methyl (meth)acrylate-styrene copolymer, polyolefin, a cycloolefin polymer, a cycloolefin copolymer, cellulose acetate, weather resistant vinyl chloride, an active energy ray-curable resin, and the like. Of the transparent synthetic resins, a polycarbonate resin or an acrylic resin is preferred as the principal component of the optical waveguide sheet 11. Since the polycarbonate resin has superior transparency and a high refractive index, when the optical waveguide sheet 11 contains the polycarbonate resin as a principal component, total reflection is likely to occur on the front and back faces of the optical waveguide sheet 11, whereby the rays of light can be efficiently propagated. Moreover, since the polycarbonate resin has heat resistance, deterioration thereof due to heat generation of the light source 12, and the like is less likely to occur. Furthermore, the polycarbonate resin has a more moderate water absorbing property as compared with acrylic resins and the like, and accordingly is superior in dimension accuracy. Therefore, when the optical waveguide sheet 11 contains the polycarbonate resin as a principal component, degradation thereof over time can be inhibited. On the other hand, since the acrylic resins have a higher degree of transparency, a loss of rays of light in the optical waveguide sheet 11 can be minimized. The optical waveguide sheet 11 contains the principal component in a proportion of preferably no less than 80% by mass, more preferably no less than 90% by mass, and still more preferably no less than 98%.

The polycarbonate resin is not particularly limited, and may be any one of a linear polycarbonate resin and a branched polycarbonate resin, or may be a polycarbonate resin mixture that contains both of the linear polycarbonate resin and the branched polycarbonate resin.

The linear polycarbonate resin is exemplified by a linear aromatic polycarbonate resin produced by a well-known phosgene process or a melt process, and the linear aromatic polycarbonate resin is constituted with a carbonate component and a diphenol component. Examples of a precursor for introducing the carbonate component include phosgene, diphenyl carbonate, and the like. Moreover, examples of the diphenol include 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,1-bis(4-hydroxyphenyl)cyclodecane, 1,1-bis(4-hydroxyphenyl)propane, 1,1-bis(3,5-dimethyl-4-hydroxyphenyl)cyclododecane, 4,4'-dihydroxydiphenyl ether, 4,4'-thiodiphenol, 4,4'-dihydroxy-3,3-dichlorodiphenyl ether, and the like. These may be used either alone or in combination of two or more types thereof.

The branched polycarbonate resin is exemplified by a polycarbonate resin produced using a branching agent, and examples of the branching agent include phloroglucin, trimellitic acid, 1,1,1-tris(4-hydroxyphenyl)ethane, 1,1,2-tris(4-hydroxyphenyl)ethane, 1,1,2-tris(4-hydroxyphenyl)propane, 1,1,1-tris(4-hydroxyphenyl)methane, 1,1,1-tris(4-hydroxyphenyl)propane, 1,1,1-tris(2-methyl-4-hydroxyphenyl)methane, 1,1,1-tris(2-methyl-4-hydroxyphenyl)ethane, 1,1,1-tris(3-methyl-4-hydroxyphenyl)methane, 1,1,1-tris(3-methyl-4-hydroxyphenyl)ethane, 1,1,1-tris(3,5-dimethyl-4-hydroxyphenyl)methane, 1,1,1-tris(3,5-dimethyl-4-hydroxyphenyl)ethane, 1,1,1-tris(3-chloro-4-hydroxyphenyl)methane, 1,1,1-tris(3-chloro-4-hydroxyphenyl)ethane, 1,1,1-tris(3,5-dichloro-4-hydroxyphenyl)methane, 1,1,1-tris(3,5-dichloro-4-hydroxyphenyl)ethane, 1,1,1-tris(3-bromo-4-hydroxyphenyl)methane, 1,1,1-tris(3-bromo-4-hydroxyphenyl)ethane, 1,1,1-tris(3,5-dibromo-4-hydroxyphenyl)methane, 1,1,1-tris(3,5-dibromo-4- hydroxyphenyl)ethane, 4,4'-dihydroxy-2,5-dihydroxydiphenyl ether, and the like.

The acrylic resin is exemplified by a resin having a skeleton derived from acrylic acid or methacrylic acid. Although the acrylic resin is not particularly limited, examples thereof include: poly(meth)acrylic acid esters such as polymethyl methacrylate; methyl methacrylate-(meth)acrylic acid copolymers; methyl methacrylate-(meth)acrylic acid ester copolymers; methyl methacrylate-acrylic acid ester-(meth)acrylic acid copolymers; methyl (meth)acrylate-styrene copolymers; polymers having an alicyclic hydrocarbon group (for example, methyl methacrylate-cyclohexyl methacrylate copolymers, methyl methacrylate-norbornyl (meth)acrylate copolymers); and the like. Of these acrylic resins, poly(meth)acrylic acid C1-6 alkyl esters such as polymethyl (meth)acrylate are preferred, and methyl methacrylate resins are more preferred.

Examples of the active energy ray-curable resin include active energy ray-curable acrylic resins, active energy ray-curable epoxy resins, and the like. The active energy ray-curable resin may be used, for example, in the form of a resin containing at least one of a photopolymerizable prepolymer, a photopolymerizable oligomer and a photopolymerizable monomer, as well as a photopolymerization initiator or the like.

Examples of the prepolymer and the oligomer which may be contained in the active energy ray-curable acrylic resin include epoxy (meth)acrylates, urethane (meth)acrylates, polyester (meth)acrylates, poly ether (meth)acrylates, and the like.

In addition, examples of the monomer which may be contained in the active energy ray-curable acrylic resin include: monofunctional (meth)acrylates such as methyl (meth)acrylate, lauryl (meth)acrylate, ethoxy diethylene glycol (meth)acrylate, methoxy triethylene glycol (meth)acrylate, phenoxyethyl (meth) acrylate, tetrahydrofurfuryl (meth) acrylate, isobornyl (meth)acrylate, 2-hydroxyethyl (meth)acrylate, 2-hydroxypropyl (meth)acrylate and 2-hydroxy-3-phenoxy (meth)acrylate; polyfunctional (meth) acrylates such as neopentyl glycol di(meth)acrylate, 1,6-hexanediol di(meth)acrylate, trimethylolpropane tri(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta (meth)acrylate, dipentaerythritol hexa(meth)acrylate, tripentaerythritol tri(meth)acrylate, tripentaerythritol hexa(meth) triacrylate, trimethylolpropane benzoate (meth)acrylate and trimethylolpropane benzoate; urethane acrylates such as glycerin di(meth)acrylate, hexamethylene diisocyanate and pentaerythritol tri(meth)acrylate hexamethylene diisocyanate; and the like.

Examples of the photopolymerization initiator include: carbonyl compounds such as acetophenone, 2,2-diethoxyacetophenone, p-dimethylacetophenone, p -dimethylaminopropiophenone, benzophenone, benzil, 2-chlorobenzophenone, 4,4'-dichlorobenzophenone, 4,4'-bisdiethylaminobenzophenone, Michler ketone, benzoin, benzoin methyl ether, benzoin ethyl ether, benzoin isopropyl ether, methyl benzoylformate, p-isopropyl-α-hydroxyisobutylphenone, α-hydroxyisobutylphenone, 2,2-dimethoxy-2-phenylacetophenone and 1-hydroxycyclohexyl phenyl ketone; sulfur compounds such as tetramethylthiram monosulfide, tetramethylthiram disulfide, thiaxanthon, 2-chlorothiaxanthon and 2-methylthiaxanthon; and the like. These photopolymerization initiators may be used either alone, or in combination of two or more types thereof.

It is to be noted that the optical waveguide sheet 11 may contain an optional component such as an ultraviolet ray-absorbing agent, a fire retardant, a stabilizer, a lubricant, a processing aid, a plasticizer, an impact resistant aid, a retardation reducing agent, a delustering agent, an antimicrobial, a fungicide, an antioxidant, a release agent and an antistatic agent.

Figure 4:
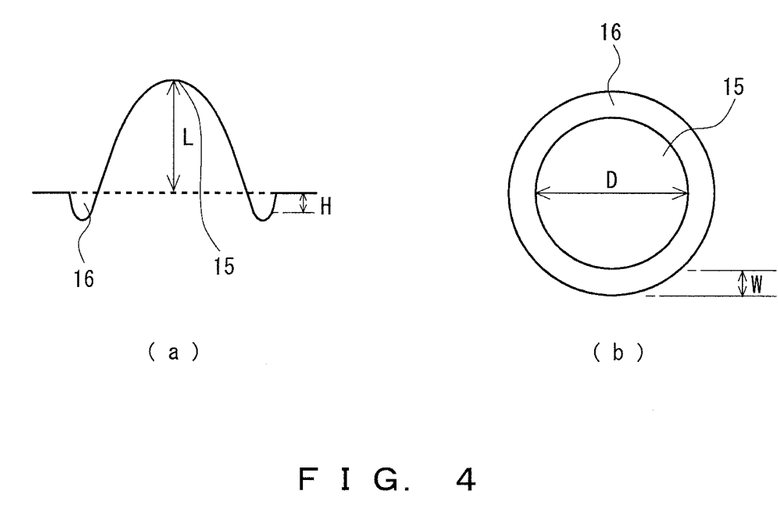
FIG. 4 shows a schematic enlarged view illustrating: (a) a cross sectional view; and (b) a bottom view of a recessed portion and a raised portion of the optical waveguide sheet shown in FIG. 3.

The recessed portion 15 is configured as a light scattering portion for scattering incident light toward the front face side. Specifically, the recessed portion 15 is formed to be substantially circular in a planar view and is present in a plurality of number on the back face of the optical waveguide sheet 11, as shown in FIGS. 3 and 4. In addition, the recessed portion 15 is formed such that the diameter thereof gradually decreases toward the front face side. The three-dimensional shape of the recessed portion 15 is not particularly limited, and may be hemispherical, substantially hemispherical, conical, frustoconical, cylindrical, or the like. Of these, the three-dimensional shape of the recessed portion 15 is preferably hemispherical. When the three-dimensional shape of the recessed portion 15 is hemispherical, the moldability of the recessed portion 15 can be improved, and additionally the rays of light having entered the recessed portion 15 can be favorably scattered.

The arrangement pattern of the recessed portions 15 is formed such that the arrangement density thereof on the back face gradually decreases from a first end to a second end. In particular, the arrangement pattern of the recessed portions 15 is formed such that the arrangement density thereof on the back face gradually decreases from the edge on the side opposite to the light source 12 to the edge on the light source 12 side. When the recessed portions 15 are formed in this manner, the rate of light scattering in the vicinity of the light source 12 may be lessened and the rate of light scattering in sites away from the light source 12 may be increased, whereby rays of light can be scattered such that uniform rays of light can be emitted over the entire front face. The adjustment of varying number of the recessed portions 15 provided per unit area in accordance with the distance of the plurality of recessed portions 15 from the light source can be achieved by adjusting the position of the recessed portions 15 to be provided.

The upper limit of the average depth (L) of the recessed portions 15 from the back face on average level (see FIG. 4a) is preferably 10 µm, more preferably 9 µm, and still more preferably 7 µm. On the other hand, the lower limit of the average depth (L) of the recessed portions 15 from the back face on average level is preferably 1 µm, more preferably 2 µm, and still more preferably 4 µm. When the average depth (L) of the recessed portions 15 from the back face on average level exceeds the upper limit, the lack in uniformity of luminance may be brought about, and additionally it may be difficult to satisfy a requirement of a reduction in thickness of the optical waveguide sheet 11. To the contrary, when the average depth (L) of the recessed portions 15 from the back face on average level is less than the lower limit, sufficient light scattering effects may not be achieved.

The upper limit of the average diameter (D) of the recessed portions 15 on the back face on average level (see FIG. 4b) is preferably 50 µm, more preferably 40 µm, and still more preferably 30 µm. On the other hand, the lower limit of the average diameter (D) of the recessed portions 15 on the back face on average level is preferably 10 µm, more preferably 12 µm, and still more preferably 15 µm. When the average diameter (D) of the recessed portions 15 on the back face on average level exceeds the upper limit, the lack in uniformity of luminance may be brought about. To the contrary, when the average diameter (D) of the recessed portions 15 on the back face on average level is less than the lower limit, sufficient light scattering effects may not be achieved.

The raised portions 16 are integrally formed on the back face of the optical waveguide sheet 11. The raised portion 16 projects toward the back face side such that the raised portion 16 extends beyond the lower end of the recessed portion 15. The raised portion 16 is formed so as to surround the recessed portion 15 annularly in a planar view, as shown in FIGS. 3 and 4. The shape of the raised portion 16 in a planar view may be selected in accordance with, for example, the shape of the outer periphery of the recessed portion 15, and may be annular, polygonal circular, or the like. Moreover, with respect to the shape of the raised portion 16 in a planar view, the raised portion 16 may not necessarily surround the outer periphery of the recessed portion 15 completely, and may partially surround the outer periphery of the recessed portion 15, for example. Of these, an annular shape is preferred as the shape of the raised portion 16 in a planar view. In the optical waveguide sheet 11, when the raised portion 16 is formed to be annular, adhesion of the recessed portion 15 and the vicinity thereof to the reflection sheet 13 or the like disposed on the back face side can be properly inhibited, whereby the lack in uniformity of luminance due to the rays of light scattered by the recessed portions 15 can be favorably inhibited. In addition, the raised portion 16 is shaped to have a rounded top. In the optical waveguide sheet 11, since the top of the raised portion 16 is rounded, the scratch-inhibiting ability with respect to the reflection sheet 13 or the like disposed on the back face side can be enhanced.

The raised portion 16 is preferably formed so as to be continuous with the recessed portion 15. Specifically, it is preferred that the inner periphery of the raised portion 16 substantially conforms to the periphery of the recessed portion 15. Moreover, it is preferred that the internal surface of the raised portion 16 is smoothly and continuously joined to the inner face of the recessed portion 15. When the raised portion 16 is smoothly and continuously joined to the recessed portion 15, the lack in uniformity of luminance of the rays of light scattered by the recessed portions 15 and exiting from the front face of the optical waveguide sheet 11 can be properly inhibited. The term "periphery" as referred to herein means a curve given by the intersection of the three-dimensional shape (recessed portion 15 or raised portion 16) with the average level of the back face of the optical waveguide sheet 11. Moreover, the term "inner periphery" as referred to means the periphery of the internal surface of the raised portion 16.

The arrangement pattern of the raised portions 16 is formed such that the arrangement density thereof on the back face gradually decreases from a first end to a second end. In particular, the arrangement pattern of the raised portions 16 is formed such that the arrangement density thereof on the back face gradually decreases from the edge on the side opposite to the light source 12 to the edge on the light source 12 side.

The upper limit of the average height (H) of the raised portions 16 from the back face on average level (see FIG. 4a) is preferably 6 μm, more preferably 5 μm, and still more preferably 4 μm. On the other hand, the lower limit of the average height (H) of the raised portions 16 from the back face on average level is preferably 0.1 μm, more preferably 0.3 μm, and still more preferably 0.5 μm. When the average height (H) of the raised portions 16 from the back face on average level exceeds the upper limit, scratches may be generated on the front face of the reflection sheet 13 or the like disposed on the back face side due to the abutting thereof on the raised portion 16. To the contrary, when the average height (H) of the raised portions 16 from the back face on average level is less than the lower limit, the sticking may not be properly inhibited. Whereas, when the average height (H) of the raised portions 16 from the back face on average level falls within the range described above, the scratch-inhibiting ability of the reflection sheet 13 or the like disposed on the back face side and the sticking-preventing ability may be improved, and in particular, the lack in uniformity of luminance due to the rays of light scattered by the recessed portions 15 can be properly inhibited.

The upper limit of the average width (W) of the raised portions 16 on the back face on average level (see FIG. 4b) is preferably 15 μm, more preferably 12 μm, and still more preferably 10 μm. On the other hand, the lower limit of the average width (W) of the raised portions 16 on the back face on average level is preferably 1 μm, more preferably 3 μm, and still more preferably 5 μm. When the average width (W) of the raised portions 16 on the back face on average level exceeds the upper limit, an area in which the raised portion 16 is in contact with the reflection sheet 13 or the like may be increased, and consequently the lack in uniformity of luminance may be brought about. To the contrary, when the average width (W) of the raised portions 16 on the back face on average level is less than the lower limit, scratches may be generated on the front face of the reflection sheet 13 or the like disposed on the back face side due to the abutting thereof on the raised portion 16.

The upper limit of the height ratio (H/W) of the average height (H) to the average width (W) in the raised portions 16 is preferably 0.8, more preferably 0.6, and still more preferably 0.4. On the other hand, the lower limit of the height ratio (H/W) of the average height (H) to the average width (W) in the raised portions 16 is preferably 0.04, more preferably 0.06, and still more preferably 0.08. When the height ratio (H/W) exceeds the upper limit, the raised portions 16 may be in sharp contact with the reflection sheet 13 or the like, and consequently the reflection sheet 13 or the like may be damaged. On the other hand, when the height ratio (H/W) is less than the lower limit, an area in which the raised portions 16 are in contact with the reflection sheet 13 or the like may be unduly increased, and consequently the lack in uniformity of luminance may be brought about.

The upper limit of the width ratio (W/D) of the average width (W) of the raised portions 16 to the average diameter (D) of the recessed portions 15 is preferably 1, more preferably 0.8, and still more preferably 0.6. On the other hand, the lower limit of the width ratio (W/D) of the average width (W) of the raised portions 16 to the average diameter (D) of the recessed portions 15 is preferably 0.1, more preferably 0.2, and still more preferably 0.3. When the width ratio (W/D) exceeds the upper limit, an area in which the raised portions 16 are in contact with the reflection sheet 13 or the like may be unduly increased, and consequently the lack in uniformity of luminance may be brought about. Moreover, when the width ratio (W/D) is less than the lower limit, the size of the raised portions 16 may be relatively so small as compared with the size of the recessed portions 15 that sufficient sticking-preventing effects may not be achieved.

Reflection Sheet

The reflection sheet 13 is disposed on the back face of the optical waveguide sheet 11, such that it abuts the plurality of raised portions 16 each provided on the back face of the optical waveguide sheet 11. The reflection sheet 13 reflects the rays of light emitted from the back face side of the optical waveguide sheet 11 toward the front face side. The reflection sheet 13 is exemplified by: a white sheet in which a filler is contained in a dispersion state in a base resin such as polyester resin; a mirror sheet obtained by vapor deposition of a metal such as aluminum and silver on the surface of a film formed from a polyester resin or the like to enhance regular reflection properties; and the like.

Light Source

The light source 12 is disposed such that an emission surface faces to (or abuts) the end face of the optical waveguide sheet 11. Various types of light sources may be used as the light source 12, and for example, a light emitting diode (LED) may be used as the light source 12. Specifically, a light source in which a plurality of light emitting diodes are arranged along the end face of the optical waveguide sheet 11 may be used as the light source 12.

Optical Sheet

The optical sheet 14 has optical functions such as the diffusion and refraction of rays of light having entered from the back face side. The optical sheet 14 is exemplified by: a light diffusion sheet having a light diffusion function; a prism sheet having a function of refraction in a normal direction; and the like.

Production Method of Optical Waveguide Sheet

The method for producing the optical waveguide sheet 12 is exemplified by:

(a) an injection molding process involving injecting a material for forming an optical waveguide sheet in a molten state into a mold having a reversal shape of the plurality of recessed portions and the plurality of raised portions each provided around each of the plurality of recessed portions;

(b) a method that involves heating again a sheet element constituted from a material for forming an optical waveguide sheet, and pressing the sheet element between the mold having the reversal shape and a metal plate or a roller to transfer the shape thereof;

(c) a method which employs extrusion molding involving feeding a material for forming an optical waveguide sheet in a molten state to a T-die, extruding the forming material from an extruder and the T-die to mold a sheet element, and pressing the sheet element between the mold having the reversal shape and a metal plate or a roller to transfer the shape thereof;

(d) a casting process (solution casting process) that involves dissolving a material for forming an optical waveguide sheet in a solvent to prepare a solution (dope) having a fluidity, pouring the solution into the mold having the reversal shape, and evaporating the solvent;

(e) a method that involves filling the mold having the reversal shape with an uncured active energy ray-curable resin, and irradiating the uncured active energy ray-curable resin with an active energy ray such as an ultraviolet ray;

(f) a method that involves providing the plurality of recessed portions on one of the faces of a sheet element in a similar manner to any one of the above alternatives (a) to (e) using a mold having merely a reversal shape of the plurality of recessed portions, and then providing the plurality of raised portions around each of the plurality of recessed portions on one of the faces of the sheet element by way of a photolithography process and a etching process;

(g) a method that involves providing the plurality of recessed portions and the plurality of raised portions each provided around each of the plurality of recessed portions on one of the faces of a sheet element constituted from a material for forming an optical waveguide sheet by way of cutting with a carbide tool, a diamond tool, an end mill or the like; and the like.

Mold

The mold which may be used is exemplified by, as described above:

(i) a mold having, on the surface thereof, a reversal shape of the plurality of recessed portions 15 provided in a certain pattern and the plurality of raised portions 16 each provided around each of the recessed portion 15; or (ii) a mold having, on the surface thereof, merely a reversal shape of the plurality of recessed portions 15 provided in a certain pattern.

Production Method of Mold Using Master Mold

The mold described in (i) of the "Mold" section may be produced using a master mold having, on the surface thereof, a plurality of recessed portions provided in a certain pattern and a plurality of raised portions each provided around each of the plurality of recessed portions.

The production method of the master mold is exemplified by:

(A) a method in which the surface of a substrate for forming a master mold is subjected to laser irradiation to simultaneously form the plurality of recessed portions and the plurality of raised portions; and (B) a method in which the surface of a substrate for forming a master mold is cut out with a carbide tool, a diamond tool, an end mill or the like to simultaneously form the plurality of recessed portions and the plurality of raised portions.

A material for forming the master mold produced according to the method (A) is exemplified by metals such as SUSs. On the other hand, a material for forming the master mold produced according to the method (B) is exemplified by metals such as SUSs, as well as comparatively rigid synthetic resins such as polycarbonate resins and acrylic resins.

It is to be noted that when the laser irradiation is executed, laser-irradiated sites are melted. As a result, upon the formation of the recessed portions, the molten material is deposited around the recessed portion to form the raised portion. On the other hand, when the cutting is executed, the materials cut out from the substrate are deposited around the recessed portion formed in the cutting to form the raised portion. The depth and/or the diameter of the recessed portion, as well as the height, width, shape and the like of the raised portion are adjusted by the laser irradiation or a cutting intensity, an angle, a diameter, and the like. It is to be noted that when the thus melted material is deposited around the recessed portion, a raised portion is likely to be formed so as to surround the recessed portion.

The laser which may be used in irradiation for the purpose of forming the plurality of recessed portions and the plurality of raised portions on the surface of the master mold is not particularly limited, and examples thereof include a carbon dioxide laser, a carbon monoxide laser, a semiconductor laser, a YAG (yttrium-aluminum-garnet) laser, and the like. Of these, a carbon dioxide laser is suitable for forming a minute shape, since the carbon monoxide laser produces beams having a wavelength of 9.3 to 10.6 μm. The carbon dioxide laser is exemplified by a transversely excited atmospheric pressure (TEA) carbon dioxide laser, a continuous oscillation carbon dioxide laser, a repetitively pulsed carbon dioxide laser, and the like.

Production Method of Mold

The production method of the mold using the master mold described above includes the steps of: (S1) providing by electroforming on the surface of a master mold, a plating layer including a reversal shape of the master mold on the surface thereof, the master mold including the plurality of recessed portions provided in a certain pattern and the plurality of raised portions each provided around each of the plurality of recessed portions; and (S2) releasing the plating layer from the master mold. In addition, in a case where the master mold is used, a material for forming the mold is exemplified by metals such as nickel, gold, silver, copper and aluminum.

The plating layer-forming step (S1) is executed, for example, by applying an electric current through nickel metal as an anode and the master mold as a cathode in a plating bath, and thereby depositing a plating layer on the surface of the master mold.

The plating layer-releasing step (S2) is executed by releasing from the master mold the plating layer deposited on the surface of the master mold in the plating layer-forming step (S1). It is to be noted that the plating layer-releasing step (S2) may further include the step of reinforcing the plating layer with a reinforcing member in order to increase the strength of the plating layer released from the master mold.

Production Method of Mold without Using Master Mold

The mold described in (ii) of the above "Mold" section may be produced without using the master mold. The production method of the mold (ii) is exemplified by a method in which a reversal shape of the plurality of recessed portions on the mold is formed on the surface of a substrate constituting the mold by way of, for example, a photolithography process and an etching process. In addition, in this instance, comparatively rigid synthetic resins such as polycarbonate resins and acrylic resins may be used as the material for forming the mold.

Advantages

Since the optical waveguide sheet 11 includes, on the back face thereof, the plurality of recessed portions 15 falling toward the front face side, the optical waveguide sheet 11 enables the rays of light having entered the recessed portions 15 to be scattered toward the front face side. Therefore, the optical waveguide sheet 11 can emit rays of light substantially uniformly from the front face side through providing the plurality of recessed portions 15 in desired positions and scattering incident light by the recessed portions 15. In addition, since the optical waveguide sheet 11 includes, as a sticking preventive means, the plurality of raised portions 16 each provided around each of the plurality of recessed portions 15 and projecting toward the back face side, the optical waveguide sheet 11 abuts the reflection sheet 13 or the like disposed on the back face side of the optical waveguide sheet 11 at dispersed points by way of the plurality of raised portions 16, whereby adhesion of the back face of the optical waveguide sheet 11 to the reflection sheet 13 or the like can be inhibited. Therefore, the optical waveguide sheet 11 can inhibit rays of light from entering such an adhering portion to give rise to the lack in uniformity of luminance, and additionally it is not necessary to separately provide a sticking preventive layer on the back face of the optical waveguide sheet, whereby the reduction in thickness can be facilitated. Furthermore, according to the optical waveguide sheet 11, since the adhesion of the recessed portions 15 and the vicinity thereof can be properly inhibited due to the raised portions 16 being provided around the recessed portions 15, the lack in uniformity of luminance due to the rays of light scattered by the recessed portions 15 can be favorably inhibited.

Due to including the optical waveguide sheet 11, the backlight unit 10 enables the rays of light having entered the plurality of recessed portions 15 provided on the back face of the optical waveguide sheet 11 to be scattered toward the front face side. Therefore, according to the backlight unit 10, the backlight unit 10 enables rays of light to be emitted substantially uniformly from the front face side through providing the plurality of recessed portions 15 in desired positions on the back face of the optical waveguide sheet 11, and scattering incident light by the recessed portions 15. Moreover, according to the backlight unit 10, since the optical waveguide sheet 11 includes, as the sticking preventive means, the plurality of raised portions 16 each provided around each of the plurality of recessed portions 15 and projecting toward the back face side, the optical waveguide sheet 11 abuts the reflection sheet 13 or the like disposed on the back face side of the optical waveguide sheet 11 at dispersed points by way of the plurality of raised portions 16, whereby adhesion of the back face of the optical waveguide sheet 11 to the reflection sheet 13 or the like can be inhibited. Therefore, the backlight unit 10 can inhibit rays of light from entering such an adhering portion to give rise to the lack in uniformity of luminance, and additionally it is not necessary to separately provide a sticking preventive layer on the back face of the optical waveguide sheet 11, whereby the reduction in thickness can be facilitated. Furthermore, according to the backlight unit 10, due to the raised portion 16 formed on the back face of the optical waveguide sheet 11 being provided around the recessed portion 15, the adhesion of the recessed portion 15 and the vicinity thereof can be properly inhibited, and consequently the lack in uniformity of luminance due to the rays of light scattered by the recessed portions 15 can be favorably inhibited.

Due to including the backlight unit 10 that includes the optical waveguide sheet 11, the portable terminal 1 can substantially uniformly emit rays of light from the front face of the optical waveguide sheet 11, and additionally the sticking of the optical waveguide sheet 11 to the reflection sheet 13 or the like disposed on the back face side of the optical waveguide sheet 11 can be inhibited, as described above. Moreover, due to including the backlight unit 10 that includes the optical waveguide sheet 11, the portable terminal 1 can facilitate the reduction in thickness.

The method for producing an optical waveguide sheet according to the embodiment of the present invention enables the optical waveguide sheet 11 to be easily and reliably produced which includes, on the back face thereof, the plurality of recessed portions 15 falling toward the front face side, and, as the sticking preventive means, the plurality of raised portions 16 each provided around each of the plurality of recessed portions 15 and projecting toward the back face side.

Since the mold according to the embodiment of the present invention includes, on the surface thereof, a reversal shape of the plurality of recessed portions provided in a certain pattern, the mold can be suitably used as a mold for use in production of the optical waveguide sheet 11.

The method for producing a mold according to the embodiment of the present invention enables a mold to be easily and reliably produced, the mold including, on the surface thereof, a reversal shape of the plurality of recessed portions provided in a certain pattern.

Since the master mold according to the embodiment of the present invention includes, on the surface thereof, the plurality of recessed portions provided in a certain pattern and the plurality of raised portions each provided around each of the plurality of recessed portions, the master mold enables a reversal shape of the plurality of recessed portions provided in a certain pattern and the plurality of raised portions each provided around each of the plurality of recessed portions to be easily and reliably formed on the surface of a mold produced using the master mold.

Other embodiments

It is to be noted that the optical waveguide sheet, the backlight unit, the portable terminal, the method for producing an optical waveguide sheet, the mold and master mold for use in production of an optical waveguide sheet, and the production method of a mold according to the embodiments of the present invention may be exploited in various modified or improved embodiments other than those as described above. For example, the optical waveguide sheet may not necessarily have a single-layer structure as long as the back face side of the optical waveguide sheet has a certain shape, and the optical waveguide sheet may have a multilayer structure including two or more layers. Moreover, the optical waveguide sheet may have a hard coating layer or the like provided on the front face thereof. Furthermore, the optical waveguide sheet may exhibit a lenticular shape or the like on the front face thereof such that outgoing rays of light can be controlled. In addition, in order to inhibit the lack in uniformity of luminance in the vicinity of the light source, the optical waveguide sheet may have a plurality of V-shaped or trapezoidal cutaways provided continuously or with a certain spacing on the end face on the light source side. The arrangement pattern of the raised portions is not particularly limited. With respect to the arrangement pattern of the raised portions, for example, in a case where the optical waveguide sheet is used in a bilateral edge-lit backlight unit in which light sources are disposed on both opposing edges, the plurality of raised portions may be provided such that the arrangement density thereof on the back face gradually increases from the both edges toward the center.

Figure 5:
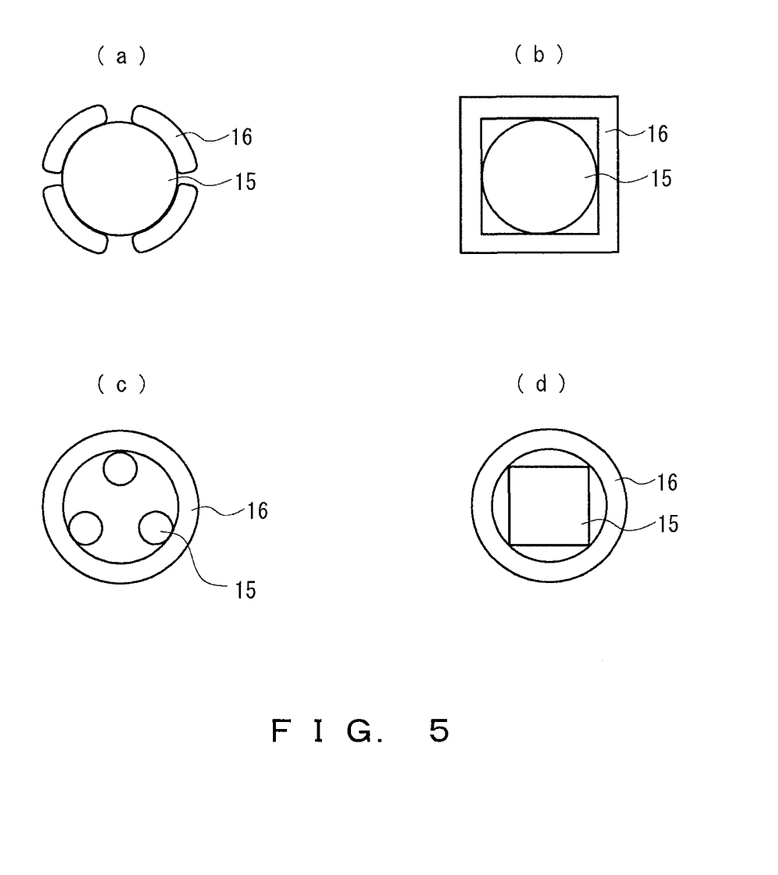
FIG. 5 shows a schematic enlarged view illustrating a recessed portion and a raised portion of an optical waveguide sheet according to an embodiment distinct from the optical waveguide sheet shown in FIG. 3.

Although the embodiment in which each single raised portion of the optical waveguide sheet annularly surrounds each single recessed portion is described above, other embodiments can be contemplated. Specifically, the following embodiments of the raise portion may be exemplified: the raised portion annularly surrounding the recessed portion but partially having cutting(s) (see FIG. 5a); the raised portion having a rectangular shape (see FIG. 5b); each single raised portion surrounding a plurality of recessed portions (see FIG. 5c); and the like.

Although the embodiment in which the recessed portions of the optical waveguide sheet is annular in a planar view is described above, the recessed portions may have other shape, such as, for example, a rectangular shape in a planar view (see FIG. 5d).

The mold (ii) may be produced by electroforming using the master mold including the plurality of recessed portions on the surface thereof. The method for producing such a master mold including the plurality of recessed portions on the surface thereof is exemplified by a method that involves providing the plurality of recessed portions on the surface of a substrate constituting the master mold by way of, for example, a photolithography process and an etching process.

In a case where the optical waveguide sheet is produced using extrusion molding in which the sheet element is molded by feeding the material for forming an optical waveguide sheet in a molten state to a T-die and extruding the forming material from an extruder and the T-die, one of a pair of pressure rollers pressing the extruded sheet element may be used as the mold having the reversal shape of the plurality of recessed portions and the plurality of raised portions each provided around each of the plurality of recessed portions. The method for forming such a reversal shape on the surface of one of the pressure rollers is exemplified by: a method involving overlaying, on the surface of the pressure roller, a plating layer including, on the surface thereof, a reversal shape of the plurality of recessed sections provided in a certain pattern and the plurality of raised sections each provided around each of the recessed sections; and a method involving forming the reversal shape on the surface of the pressure roller by means of a laser or by way of cutting. Moreover, in this instance, a reversal shape of a lenticular shape, for example, may be formed on the surface of the other pressure roller, and consequently the lenticular shape may be formed on the front face of the optical waveguide sheet.

With respect to the edge-lit backlight unit according to the embodiment of the present invention, disposing the reflection sheet on the back face side of the optical waveguide sheet is not necessary, and for example, the front face of the top plate disposed on the back face side of the optical waveguide sheet may be polished so as to serve as a reflection surface, whereby the reflection surface may substitute for the reflection sheet. When the front face of the top plate is formed so as to serve as the rearmost face of the backlight unit in this manner, the edge-lit backlight unit can facilitate the reduction in thickness by omitting the reflection sheet.

The portable terminal is exemplified by various portable terminals such as the laptop computers described above; mobile phones such as smartphones; personal digital assistants such as tablet terminals; and the like. Furthermore, the optical waveguide sheet and the edge-lit backlight unit can be used in various liquid crystal display devices such as laptop computers whose housing (casing) has a thickness of greater than 21 mm, desktop computers and flat-screen televisions, in addition to the mobile terminal described above.

As described in the foregoing, the optical waveguide sheet, the backlight unit and the portable terminal according to the embodiments of the present invention enable the sticking of the optical waveguide sheet to the reflection sheet, the top plate or the like disposed on the back face side of the optical waveguide sheet to be inhibited without separately providing a sticking preventive layer. Accordingly, the optical waveguide sheet, the backlight unit and the portable terminal according to the embodiments of the present invention can be suitably used in liquid crystal display devices in which the lack in uniformity of luminance is inhibited and a reduction in thickness is facilitated.

EXPLANATION OF THE REFERENCE SYMBOLS

1 mobile terminal, ultrathin computer
2 operation unit
3 liquid crystal display unit
4 liquid crystal panel
5 casing for liquid crystal display unit
6 top plate
7 front face support member
8 hinge part
9 casing for operation unit
10 backlight unit
11 optical waveguide sheet
12 light source
13 reflection sheet
14 optical sheet
15 recessed portion 16 raised portion
110 edge-lit backlight unit
111 optical waveguide sheet
112 optical sheet
115 reflection sheet
116 top plate
117 light source
210 edge-lit backlight unit
211 optical waveguide sheet
212 optical sheet
216 top plate
216a reflection surface
217 light source

The invention claimed is:

1. An optical waveguide sheet for use in an edge-lit backlight unit, the optical waveguide sheet having a function of allowing rays of light to enter an end face of the optical waveguide sheet and emitting the rays of light from a front thee substantially uniformly,
wherein the optical waveguide sheet comprises, on a back side thereof:
a plurality of recessed portions falling toward a front face side; and
a plurality of raised portions each provided around each of the plurality of recessed portions and projecting toward a back thee side; and
the raised portions are each shaped to have a surface smoothly and continuously joined to corresponding one of the recessed portions and to have a rounded top by forming the recessed portions and the raised portions by molding directly with a plate-shaped mold having, on a surface thereof, a reversal shape of a plurality of recessed portions provided in a certain pattern and a plurality of raised portions each provided around each of the recessed portions, a depth (L) of the recessed portions is in a range of 1 μm to 10 μm, a diameter (D) of the recessed portions is in a range of 10 μm to 50 μm, a height (H) of the raised portions is in a range of 0.1 μm to 5 μm, each raised portion is formed to be substantially annular in a planar view so as to surround each of the recessed portions, and a width of the raised portions is in a range of 1 μm to 10 μm, and a height ratio (H/W) of a height (H) to a width (W) of the raised portions is in a range of 0.05 to 0.5.

2. The optical waveguide sheet according to claim 1, comprising a polycarbonate resin as a principal component.

3. The optical waveguide sheet according to claim 1, wherein the optical waveguide sheet has an average thickness of no less than 100 μm and no greater than 600 μm and is configured for use as a light guide film.

4. An edge-lit backlight unit comprising:
the optical waveguide sheet according to claim 1; and
a light source that emits rays of light toward an end face of the optical waveguide sheet.

5. A portable terminal comprising the backlight unit according to claim 4 in a liquid crystal display unit.

6. The optical waveguide sheet according to claim 1, wherein a number of the recessed portions and the raised portions on a row proximate a first side of the waveguide sheet is higher than a number of the recessed portions and the raised portions on a row proximate a second side of the waveguide sheet, wherein the second side is opposite to the first side.

7. The optical waveguide sheet according to claim 1, wherein a number of the recessed portions and the raised portions on a row proximate a first side of the waveguide sheet is substantially higher than a number of the recessed portions and the raised portions on a row proximate a second side of the waveguide sheet, wherein the second side is opposite to the first side.

* * * * *

UNITED STATES PATENT AND TRADEMARK OFFICE
CERTIFICATE OF CORRECTION

PATENT NO. : 9,977,171 B2
APPLICATION NO. : 14/626239
DATED : May 22, 2018
INVENTOR(S) : Hironori Nakashima et al.

It is certified that error appears in the above-identified patent and that said Letters Patent is hereby corrected as shown below:

In the Claims (1) Claim 1, Column 19, Line 19, should be corrected as follows:
From "thee substantially uniformly"
To --face substantially uniformly--

(2) Claim 1, Column 19, Line 26, should be corrected as follows:
From "a back thee side; and"
To --a back face side; and--

(3) Claim 1, Column 20, Line 8, should be corrected as follows:
From "portions is in a range of 0.05to 0.5"
To --portions is in a range of 0.05 to 0.5--

Signed and Sealed this
Seventh Day of August, 2018

Andrei Iancu
*Director of the United States Patent and Trademark Office*